United States Patent
Tanaka et al.

(10) Patent No.: US 9,557,821 B2
(45) Date of Patent: Jan. 31, 2017

(54) GESTURE RECOGNITION APPARATUS AND CONTROL METHOD OF GESTURE RECOGNITION APPARATUS

(71) Applicants: Kiyoaki Tanaka, Shiga (JP); Takayoshi Yamashita, Aichi (JP); Mizuki Furuta, Kyoto (JP)

(72) Inventors: Kiyoaki Tanaka, Shiga (JP); Takayoshi Yamashita, Aichi (JP); Mizuki Furuta, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/614,823

(22) Filed: Feb. 5, 2015

(65) Prior Publication Data

US 2015/0261303 A1 Sep. 17, 2015

(30) Foreign Application Priority Data

Mar. 12, 2014 (JP) ................. 2014-048911

(51) Int. Cl.
*G06F 3/01* (2006.01)
*G06F 3/0346* (2013.01)
(Continued)

(52) U.S. Cl.
CPC ............. *G06F 3/017* (2013.01); *G06F 3/0346* (2013.01); *G06F 3/04883* (2013.01);
(Continued)

(58) Field of Classification Search
CPC combination set(s) only.
See application file for complete search history.

(56) References Cited

U.S. PATENT DOCUMENTS

2012/0176303 A1 7/2012 Miyake
2013/0307768 A1 11/2013 Kim et al.
(Continued)

FOREIGN PATENT DOCUMENTS

JP 2009-042796 A 2/2009
JP 4897939 B2 3/2012
(Continued)

OTHER PUBLICATIONS

Partial Translation of Office Action in counterpart Korean Patent Application No. 10-2015-0011034 issued Sep. 14, 2015 (3 pages).
(Continued)

*Primary Examiner* — Van Chow
(74) *Attorney, Agent, or Firm* — Osha Liang LLP (57) ABSTRACT

A gesture recognition apparatus detecting a gesture from an image and generating for an object device an instruction corresponding to the gesture, the gesture recognition apparatus comprises an image acquiring unit configured to acquire an image; an object part extracting unit configured to extract an object part performing a gesture; an object part shape identifying unit configured to identify a shape of the extracted object part; a representative point determining unit configured to set a representative point that is a point representing a position of the object part; a gesture recognizing unit configured to recognize a gesture, based on a motion of the representative point; and a command generating unit configured to generate an instruction corresponding to the recognized gesture, wherein the representative point determining unit determines a position of a representative point corresponding to the object part, using the identified shape of the object part.

9 Claims, 7 Drawing Sheets

(51) Int. Cl.
*G06F 3/0488* (2013.01)
*G06K 9/00* (2006.01)
*G06K 9/46* (2006.01)
*G06T 7/20* (2006.01)

(52) U.S. Cl.
CPC ....... *G06K 9/00355* (2013.01); *G06K 9/4604* (2013.01); *G06T 7/20* (2013.01)

(56) References Cited

U.S. PATENT DOCUMENTS

2013/0335303 A1   12/2013   Maciocci et al.
2015/0153833 A1*  6/2015    Pinault ................... G06F 3/011
                                                          345/156

FOREIGN PATENT DOCUMENTS

JP   2012-123608 A   6/2012
WO   2014/009561 A2  1/2014

OTHER PUBLICATIONS

Extended European Search Report in counterpart European Application No. 15 152 637.3 issued Aug. 3, 2015 (7 pages).

* cited by examiner

FIG. 1

| GESTURE DEFINITION DATA | |
|---|---|
| MOTION OF REPRESENTATIVE POINT | CONTENTS OF GESTURE |
| MOVE LEFTWARD BY 100 PIXELS OR MORE | TURN VOLUME DOWN |
| MOVE RIGHTWARD BY 100 PIXELS OR MORE | TURN VOLUME UP |
| MOVE UPWARD BY 100 PIXELS OR MORE | TO NEXT CHANNEL |
| MOVE DOWNWARD BY 100 PIXELS OR MORE | TO PREVIOUS CHANNEL |
| RESPECTIVELY MOVE BY 100 PIXELS OR MORE IN SEQUENCE OF DOWNWARD → RIGHTWARD | TURN POWER ON/OFF |
| DRAW CIRCLE WITH RADIUS OF 100 PIXELS OR MORE | DISPLAY PROGRAM GUIDE |
| ... | ... |

GESTURE BY FINGER

FIG. 4A

GESTURE BY PALM OF HAND

WHEN SHAPE TYPE 1

FIG. 7A

WHEN OTHER THAN SHAPE TYPE 1

FIG. 7B

GESTURE RECOGNITION APPARATUS AND CONTROL METHOD OF GESTURE RECOGNITION APPARATUS

BACKGROUND OF THE INVENTION

Field of the Invention

The present invention relates to a gesture recognition apparatus that recognizes an input operation with a gesture.

Description of the Related Art

Apparatuses that enable input with a gesture to a computer or an electronic device are becoming increasingly popular.

For example, Japanese Patent Application Laid-open No. 2012-123608 describes an input apparatus configured to capture an image of a gesture performed by a user in a space using a camera or the like and to convert the gesture into an input command.

The apparatus stores a specific gesture and a specific input command in association with each other and includes a unit configured to recognize a gesture and a unit configured to convert the recognized gesture into an input command. Accordingly, a user can input an arbitrary command without having to directly operate an input device by simply performing a gesture action in front of the apparatus.

SUMMARY OF THE INVENTION

With an input apparatus that recognizes a gesture, generally, a point that represents a position of a part performing a gesture (hereinafter, a representative point) is extracted from an image of the part, and a motion of the extracted representative point is tracked to determine what kind of gesture had been performed. For example, when a user performs a gesture of drawing a graphic by opening the palm of a hand, by detecting a center point of the hand and tracking a locus of the center point, a shape of the graphic drawn by the gesture is recognized.

However, when performing a gesture using a hand, setting a representative point at the center of the hand may not always be the best option. For example, when a gesture is performed by raising an index finger, a recognition result that is more natural to the user can be obtained by tracking a fingertip of the index finger. In such a case, setting a representative point to the center of the hand creates a risk that a correct input cannot be made when only a fingertip is moved instead of making a large motion with the hand.

When performing a gesture using only a part of the body as described above, a conventional gesture recognition apparatus cannot always appropriately determine where a representative point is set and, as a result, cannot always recognize a locus expressed by a gesture as intended by the user.

The present invention has been made in consideration of the problem described above and an object thereof is to provide a technique that enables a gesture recognition apparatus configured to recognize a gesture performed by a user by moving an object part to recognize a gesture as intended by the user.

In order to solve the problems described above, the gesture recognition apparatus according to the present invention is configured to determine a shape of an object part that is a body part to perform a gesture and to determine a position of a representative point in consideration of the shape.

Specifically, a gesture recognition apparatus according to the present invention is a gesture recognition apparatus detecting a gesture from an acquired image and generating for an object device an instruction corresponding to the gesture, the gesture recognition apparatus including: an image acquiring unit configured to acquire an image; an object part extracting unit configured to extract an object part to perform a gesture from the acquired image; an object part shape identifying unit configured to identify a shape of the extracted object part; a representative point determining unit configured to set, with respect to the object part, a representative point that is a point representing a position of the object part; a gesture recognizing unit configured to recognize a gesture, based on a motion of the representative point; and a command generating unit configured to generate an instruction corresponding to the recognized gesture, wherein the representative point determining unit determines a position of a representative point corresponding to the object part, using the identified shape of the object part.

An object part refers to a part of a user which is used to perform a gesture and which is typically a human hand. However, alternatively, an object part may be an entire human body, a marker for inputting that is owned by the user, or the like. While an input gesture can be recognized by tracking a motion of a representative point corresponding to an object part, with the gesture recognition apparatus according to the present invention, a position of a representative point of an object part is determined using a shape of the object part.

In this manner, the gesture recognition apparatus according to the present invention determines a position of a representative point in consideration of a shape of an object part. Accordingly, a gesture input by moving an object part can be recognized as intended by a user.

In addition, the representative point determining unit may be configured to set a representative point at a tip of the protruding part when the shape of the object part as identified by the object part shape identifying unit is a shape including a protruding part.

When an object part has a partially-protruding shape, it is likely that a gesture is to be input by a motion of the protruding part. Examples include a case where the user is raising at least one of his or her fingers and a case where the user is holding a rod-like input marker. In such a case, a representative point is favorably set at a tip of the part.

Furthermore, the object part may be a human hand, and the representative point determining unit may be configured to determine whether the shape of the object part as identified by the object part shape identifying unit is a first shape or a second shape that differs from the first shape, to set a representative point at a position corresponding to a fingertip when the shape of the object part is the first shape, and to set a representative point at a position corresponding to a center of a hand when the shape of the object part is the second shape.

When the object part is a human hand, there are two conceivable cases, namely, a case where a gesture is performed using a fingertip and a case where a gesture is performed using the entire hand. Therefore, a position of a representative point is favorably on a fingertip or at the center of the hand.

When it is presumed that a gesture is being performed using a fingertip instead of the entire hand, a representative point is set at a position corresponding to the fingertip. Accordingly, a gesture can be recognized as intended by the user even when the gesture is performed with a small motion of a fingertip.

In addition, the representative point determining unit may be configured to determine that a shape of a hand that is an object part as identified by the object part shape identifying unit is a first shape when at least one of the fingers is extended and to determine that a shape of a hand that is an object part as identified by the object part shape identifying unit is a second shape when all of the fingers are extended or all of the fingers are folded. Furthermore, the representative point determining unit may be configured to determine that a shape of a hand that is an object part is a first shape when only one finger is extended.

When at least one of five fingers is extended, it is presumable that a gesture is being performed using a fingertip. In addition, when all of the fingers are extended or all of the fingers are folded, it is presumable that a gesture is being performed by moving the entire hand. Furthermore, when only one extended finger is detected, it is presumable that a gesture is being performed by using a fingertip. Moreover, it is assumed that a state where at least one of the fingers is extended does not include a state where all of the fingers are unfolded.

In addition, the representative point determining unit may be configured to use a center of gravity of a region corresponding to the hand as extracted by the object part extracting unit as a position corresponding to the center of the hand.

A center of gravity that can be readily calculated is favorably used as a position corresponding to the center of the hand.

Furthermore, the gesture recognition apparatus according to the present invention may further include a notifying unit configured to notify the user of a set position of a representative point.

Examples of the notifying unit include a display apparatus and a sound output apparatus. For example, where a representative point is set may be displayed on a screen. By adopting such a configuration, the user can be informed as to where a point that is being tracked by the gesture recognition apparatus is and usability can be further improved.

Moreover, the present invention can be identified as a gesture recognition apparatus including at least a part of the units described above. The present invention can also be identified as a control method of the gesture recognition apparatus, a program that causes the gesture recognition apparatus to be operated, and a recording medium on which the program is recorded. The processes and units described above may be implemented in any combination insofar as technical contradictions do not occur.

According to the present invention, with a gesture recognition apparatus that recognizes a gesture performed by a user by moving an object part, a gesture can be recognized as intended by the user.

DESCRIPTION OF THE EMBODIMENTS

First Embodiment

Figure 1:
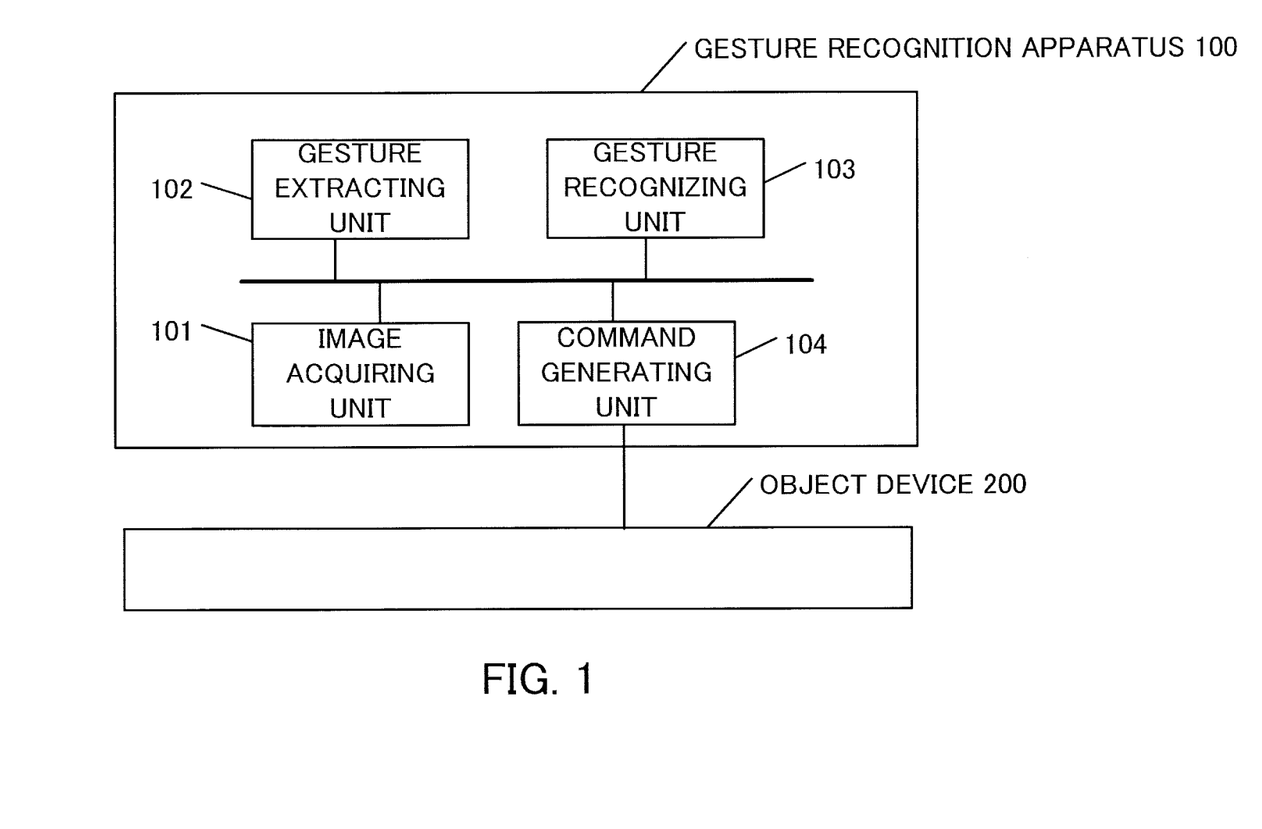
FIG. 1 is a configuration diagram of a gesture recognition system according to a first embodiment.

An outline of a gesture recognition system according to the first embodiment will be described with reference to FIG. 1 which is a system configuration diagram. The gesture recognition system according to the first embodiment is a system constituted by a gesture recognition apparatus 100 and an object device 200.

The gesture recognition apparatus 100 is an apparatus configured to recognize a gesture performed by a user using a camera and to generate a command corresponding to the gesture and to transmit the gesture to the object device 200.

In addition, the object device 200 is an apparatus (a device that is a control object) configured to receive a command from the gesture recognition apparatus 100 and is typically an electric appliance such as a television set, a video recorder, a computer, an air conditioner, and a teleconference system. The object device 200 may be any kind of device as long as a command can be received from the gesture recognition apparatus 100 in a wired or wireless manner. In the present embodiment, it is assumed that the object device 200 is a television receiver and that the gesture recognition apparatus 100 is an apparatus that is built into the television receiver.

The gesture recognition apparatus 100 will now be described in detail. The gesture recognition apparatus 100 includes an image acquiring unit 101, a gesture extracting unit 102, a gesture recognizing unit 103, and a command generating unit 104.

The image acquiring unit 101 is a unit configured to externally acquire an image. In the present embodiment, an image of a user is captured using a camera (not shown) attached to an upper part of the front of a television screen. The camera used by the image acquiring unit 101 may be a camera that acquires an RGB image or a camera that acquires a grayscale image or an infrared image. In addition, an image need not necessarily be acquired by a camera and, for example, an image which is generated by a distance sensor and which represents a distance distribution (distance image) may be used instead. Alternatively, a combination of a distance sensor and a camera or the like may be adopted.

An image acquired by the image acquiring unit 101 (hereinafter, a camera image) may be any kind of image as long as the image enables a motion of a gesture performed by the user and a shape of a body part having performed the gesture to be acquired. In addition, an angle of view of the camera image may be approximately the same as a viewing angle of the television receiver.

The gesture extracting unit 102 is a unit configured to detect a body part (hereinafter, an object part) that performs a gesture from a camera image acquired by the image acquiring unit 101. In the present embodiment, it is assumed that the user is to perform a gesture using a hand. For example, the gesture extracting unit 102 detects a region representing a human hand from a camera image.

In addition, with respect to a detected object part, the gesture extracting unit 102 sets a representative point that is a point representing a position of the object part and tracks a motion of the representative point. Accordingly, a motion expressed by a gesture can be extracted.

A shape and a representative point of an object part will be described in detail later.

Figure 2:
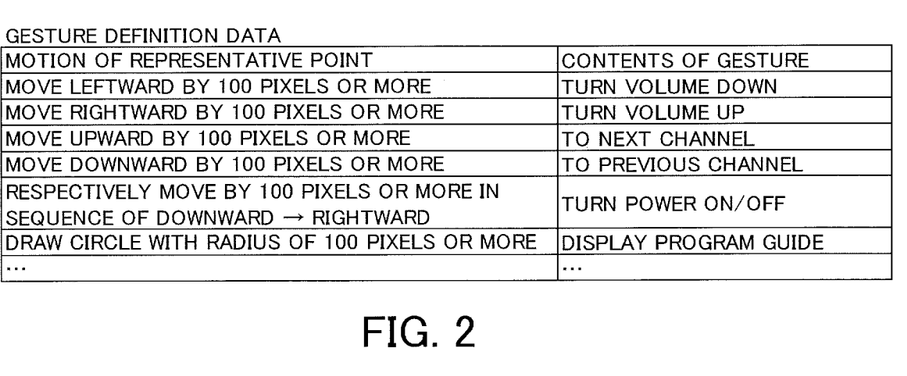
FIG. 2 is a diagram explaining an example of gesture definition data.

The gesture recognizing unit 103 is a unit configured to identify contents of a gesture based on the motion of the representative point extracted by the gesture extracting unit 102. For example, the gesture recognizing unit 103 stores data (gesture definition data) associating a motion of a representative point with contents of a gesture as shown in FIG. 2 and identifies an instruction expressed by a gesture. With an instruction expressed by a gesture, as shown in FIG. 2, a series of gesture actions may correspond to a single instruction or an instruction may cause a pointer displayed on a screen to be moved based on a movement amount and a movement direction of the representative point.

The command generating unit 104 is a unit configured to generate a command corresponding to the gesture identified by the gesture recognizing unit 103. A command refers to a signal for controlling the object device 200 and may be an electric signal, a signal modulated by radio, a pulse-modulated infrared signal, or the like.

The gesture recognition apparatus 100 is a computer including a processor, a main storage device, and an auxiliary storage device. The respective units described above function when a program stored in the auxiliary storage device is loaded to the main storage device and executed by the processor (the processor, the main storage device, and the auxiliary storage device are not shown).

Next, a gesture recognition process will be described in detail.

Figure 3:
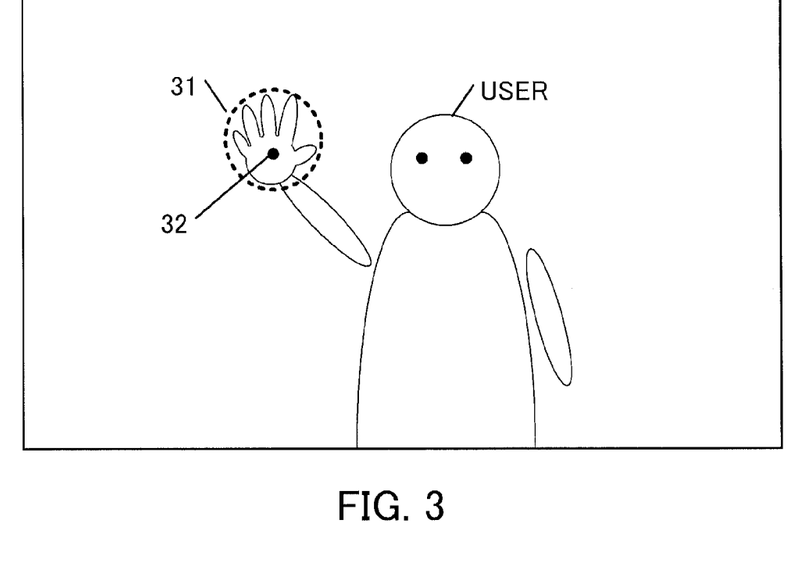
FIG. 3 is a diagram explaining an example of object part extraction.

FIG. 3 shows an example of an image acquired by the image acquiring unit 101. Specifically, FIG. 3 depicts a user directly facing a television screen as viewed from the screen.

A gesture recognition process is constituted by a process of detecting an object part to perform a gesture from an image, a process of setting a representative point corresponding to the detected object part, and a process of identifying contents of the gesture by tracking a motion of the representative point.

First, detection of an object part will be described.

The gesture extracting unit 102 detects a region (reference numeral 31) including a human hand from an acquired image. For example, a region including a human hand may be determined based on color or shape or may be determined by detecting a feature point. Alternatively, a region including a human hand may be determined by a comparison with a model, a template, or the like stored in advance. Since known techniques can be used for hand detection, a detailed description will be omitted.

Next, a representative point will be described.

A representative point is a point representing a position of an object part and one representative point is to be set for one object part. For example, when the object part is a human hand, a point (reference numeral 32) representing a center of a palm of the hand can be used as the representative point.

By setting a representative point to an object part and tracking a motion of the representative point, a gesture expressed by a motion of the hand can be acquired. For example, gestures such as "moving an entire hand to indicate a direction" and "drawing a graphic" can be acquired.

Problems found in conventional art will now be described with reference to FIGS. 4A and 4B.

Figure 4A:
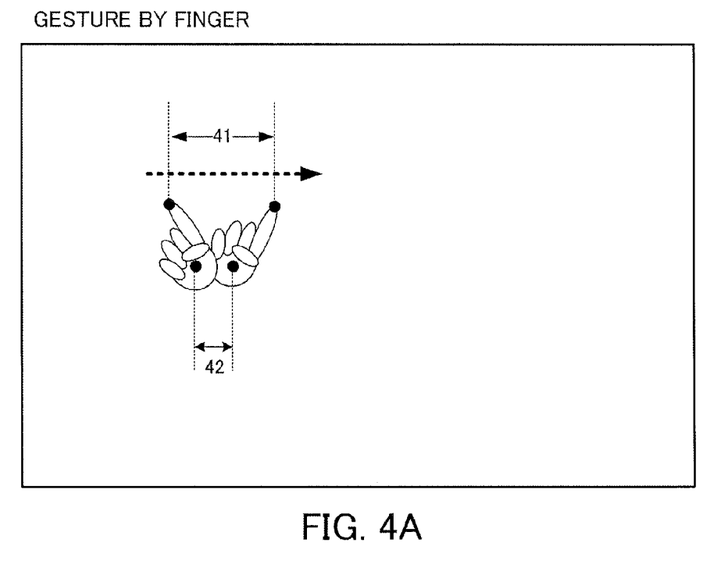
FIGS. 4A and 4B are diagrams explaining a difference in shapes of object parts.
Figure 4B:
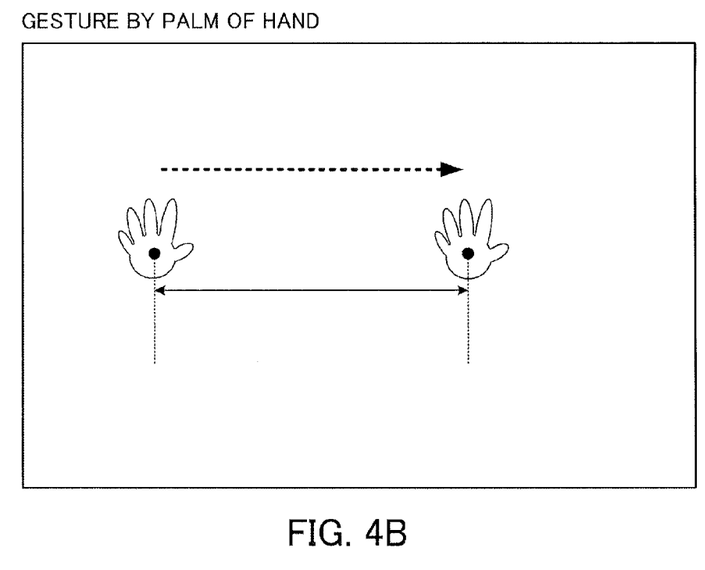

FIGS. 4A and 4B show examples of a camera image (parts other than an object part are not illustrated). FIG. 4A represents a gesture that involves moving a fingertip of an index finger while FIG. 4B represents a gesture that involves moving the palm of the hand horizontally.

Although the two gestures both signify "a movement to the left", a gesture performed by raising a finger often represents an attempt to perform a gesture with a fine motion of a fingertip while a gesture performed by an unfolded hand often represents an attempt to perform a gesture with a large motion of an entire arm. Therefore, recognition accuracy of a gesture changes depending on which portion of an object part a representative point is set to.

For example, in the case of FIG. 4A, a movement distance is a distance indicated by reference numeral 41 when the representative point is set to the fingertip of the index finger while the movement distance is a distance indicated by reference numeral 42 when the representative point is set to the center of the palm of the hand. In other words, when a different command is assigned by the movement distance, there is a risk that a command that differs from a desired command is input erroneously. In addition, when moving a pointer in accordance with the movement distance, there is a risk that a movement amount desired by the user is not obtained.

In consideration thereof, with the gesture recognition apparatus according to the present embodiment, recognition accuracy of a gesture is improved by determining a position of a representative point using a shape of an object part.

In the present embodiment, shapes of an object part are distinguished according to the number of raised fingers. For example, in the case of FIG. 4A, the number of raised fingers is determined to be one and, in the case of FIG. 4B, the number of raised fingers is determined to be five. In the following description, a state where one finger is raised will be referred to as "shape type 1" and a state where five fingers are raised will be referred to as "shape type 5". In addition, it is assumed that "shape type n" signifies that there are n-number of raised fingers.

The number of raised fingers may be determined by, for example, searching for a pointed shape (or a protruding part) that is seemingly a finger in a periphery of a detected hand or by performing matching using a template image, a hand skeleton model, or the like. Since known methods can be used to determine the number of fingers, a detailed description will be omitted.

In the present embodiment, when the gesture extracting unit 102 determines a shape of a hand and the shape causes a determination that a gesture is being performed by a fingertip to be made, a representative point is set at a position corresponding to the fingertip. In other cases, a representative point is set to a center of gravity of the detected hand. A shape causing a determination that a gesture is being performed by a fingertip to be made can be, for example, a case where the number of raised fingers is one (a case where the shape of the object part is "shape type 1").

Next, entire processing performed by the gesture recognition apparatus 100 according to the present embodiment will be described with reference to FIGS. 5 and 6 that are processing flow charts.

Figure 5:
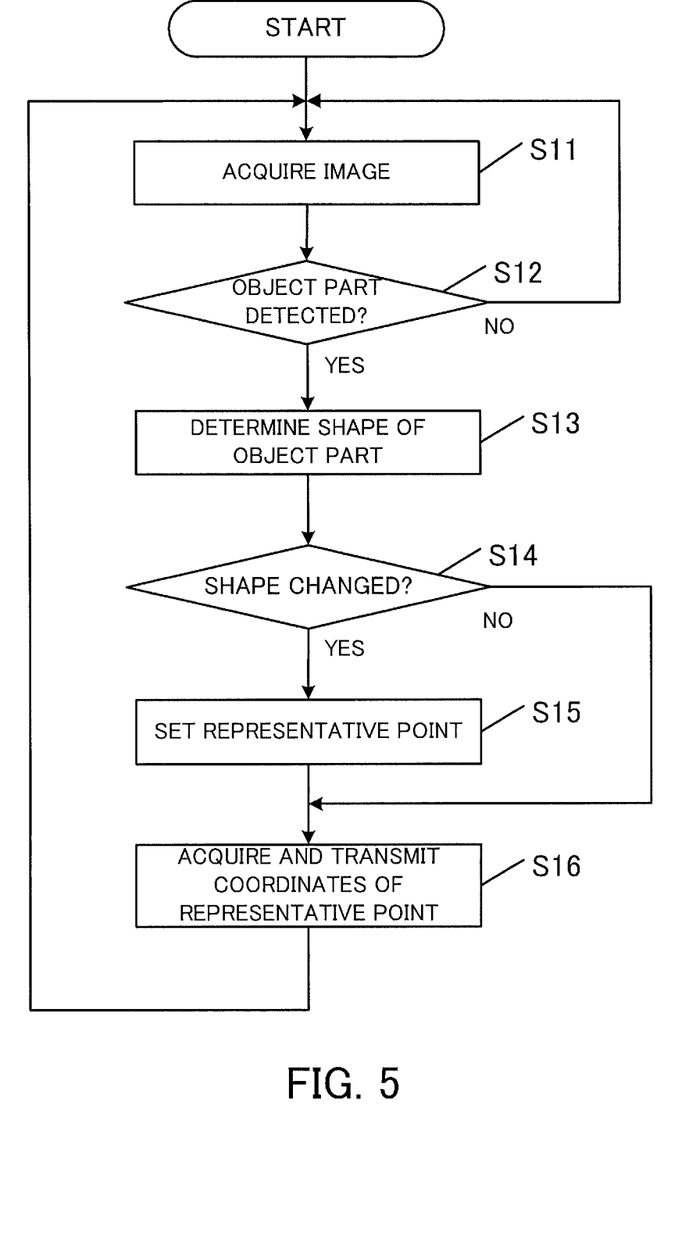
FIG. 5 is a flow chart representing processing performed by a gesture recognition apparatus in the first embodiment.

The processing shown in FIG. 5 is processing performed by the image acquiring unit 101 and the gesture extracting unit 102. The processing may be started when an operation representing a start of input (for example, when a function requiring a gesture input is started on the object device) is performed or when power of the object device is turned on.

First, the image acquiring unit 101 acquires a camera image (step S11). In the present step, for example, an RGB image is acquired using a camera provided in an upper part of the front of the television screen.

Next, the gesture extracting unit 102 attempts to detect an object part (a hand) from the acquired camera image (step S12). As described earlier, the detection of an object part may be performed based on color or shape or may be performed by pattern matching or the like. At this point, when an object part is not detected, a new image is acquired after standing by for a prescribed period of time and similar processing is repeated.

Next, the gesture extracting unit 102 determines a shape of the detected object part (step S13). In the present example, a determination is made on whether the shape of the object part is shape type 1 or another shape type. If the shape of the object part is a shape type other than predefined shape types, the processing may be suspended and a return may be made to step S11 or a determination of "not applicable" may be made to continue the processing.

Next, a determination is made on whether the detected shape of the object part has changed from a previous execution (step S14). When step S14 is executed for the first time, a determination of "changed" is made.

When a determination of "changed" is made in step S14, a transition is made to step S15 and the gesture extracting unit 102 sets a representative point on the detected object part. Specifically, when the shape of the object part determined in step S13 is shape type 1, a representative point is set at a tip of an extended finger, and when the shape is another shape type, a representative point is set to a center-of-gravity point of the hand.

When a determination of "unchanged" is made in step S14, a transition is made to step S16.

Next, the gesture extracting unit 102 acquires coordinates of a representative point in the camera image and transmits the coordinates to the gesture recognizing unit 103 (step S16).

The processes of steps S11 to S16 are repetitively executed and coordinates of representative points are sequentially transmitted to the gesture recognizing unit 103.

Figure 6:
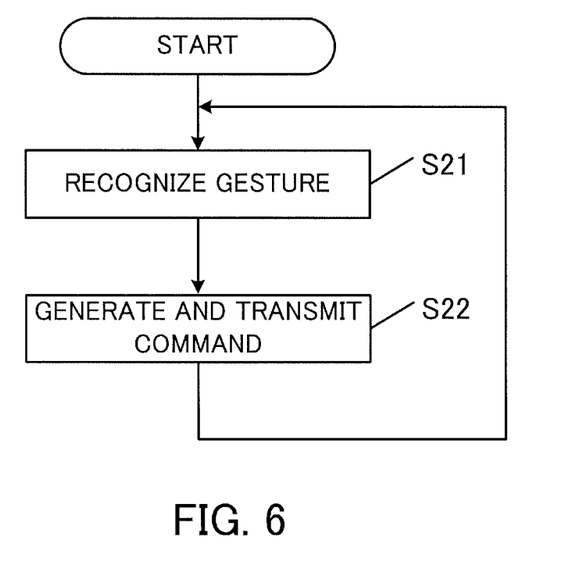
FIG. 6 is a flow chart representing processing performed by a gesture recognition apparatus in the first embodiment.

The processing shown in FIG. 6 is processing performed by the gesture recognizing unit 103 and the command generating unit 104. This process is started at the same time as the processing shown in FIG. 5.

Step S21 is a process in which the gesture recognizing unit 103 recognizes a gesture based on acquired coordinates of a representative point. For example, when the gesture definition data shown in FIG. 2 is available and a detection is made that the coordinates of the representative point has moved rightward by 100 pixels or more, it is determined that a gesture representing "turn up volume" has been performed.

Moreover, information transmitted from the gesture extracting unit 102 to the gesture recognizing unit 103 need not necessarily be coordinates in a camera image as long as a movement direction and a movement amount of a representative point can be represented. For example, the information may be a conversion of coordinates of a representative point to a coordinate system having the user as its origin or other data representing a movement direction and a movement amount.

In addition, information representing a size of an object part in a camera image may be simultaneously transmitted. Since a movement amount of an object part acquired by the gesture recognition apparatus changes in accordance with a distance between the user and the apparatus, transmitting such information enables the movement amount to be corrected in accordance with the size of the object part.

Next, the command generating unit 104 generates a control signal corresponding to the recognized gesture and transmits the control signal to the object device 200 (step S22). In the example described above, for example, a control signal associated with a "turn up volume" instruction (a signal that turns up the volume by one level) is generated and transmitted to the object device 200.

The processing shown in FIGS. 5 and 6 is periodically executed and are ended when an operation representing an end of input (for example, when an operation using gesture input is ended on the object device) is performed.

As described above, the gesture recognition apparatus according to the first embodiment sets a position of a representative point to a different position according to a shape of an object part having performed a gesture. Accordingly, regardless of whether a gesture is being performed using a fingertip or an entire hand, the gesture can be accurately recognized.

Moreover, while the shape of an object part is determined in step S13 in the description of the present embodiment, a configuration may be adopted in which step S13 is executed only once after detecting an object part and is skipped after a gesture is started. By adopting such a configuration, an amount of processing can be reduced.

However, there may be cases where a gesture ends and a different gesture is started in succession. In such a case, a configuration may be adopted in which step S13 is executed once again. For example, when a shape or a size of an object part changes significantly or when an object part moves out of frame of an image and subsequently reenters the frame, a determination that a different gesture has been started may be made and step S13 may be executed once again. Alternatively, step S13 may be executed once again in accordance with an explicit operation.

Second Embodiment

The second embodiment is an embodiment which adds a unit configured to notify a position of a representative point to a user to the gesture recognition system according to the first embodiment. A configuration of a gesture recognition system according to the second embodiment is similar to that of the first embodiment with the exception of the points described below.

While a flow chart of processing performed by a gesture recognition apparatus 100 according to the second embodiment is similar to FIGS. 5 and 6, the processing differs from that shown in FIGS. 5 and 6 in that, when an object part is set in step S15, the gesture extracting unit 102 notifies a user of a position where a representative point is set through a screen (in the present example, a television screen) provided on an object device 200.

Figure 7A:
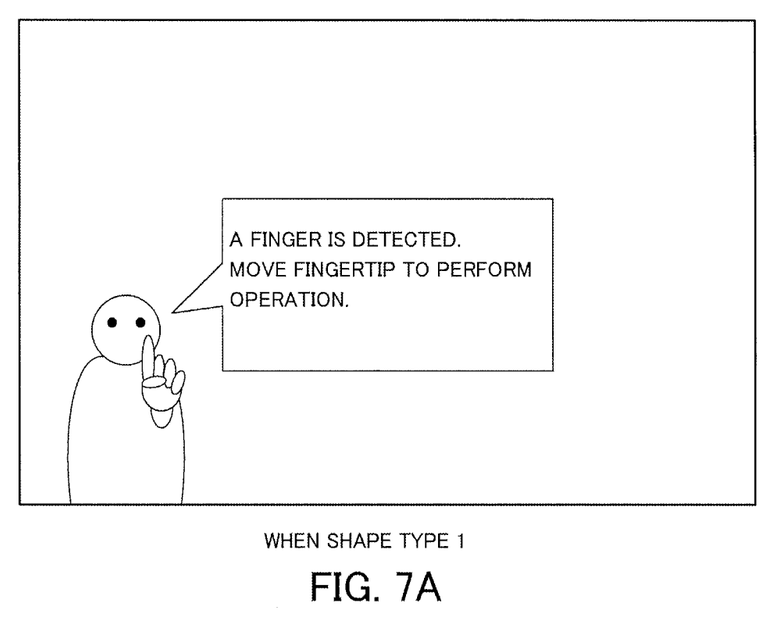
FIGS. 7A and 7B are diagrams showing examples of a notification screen according to a second embodiment.
Figure 7B:
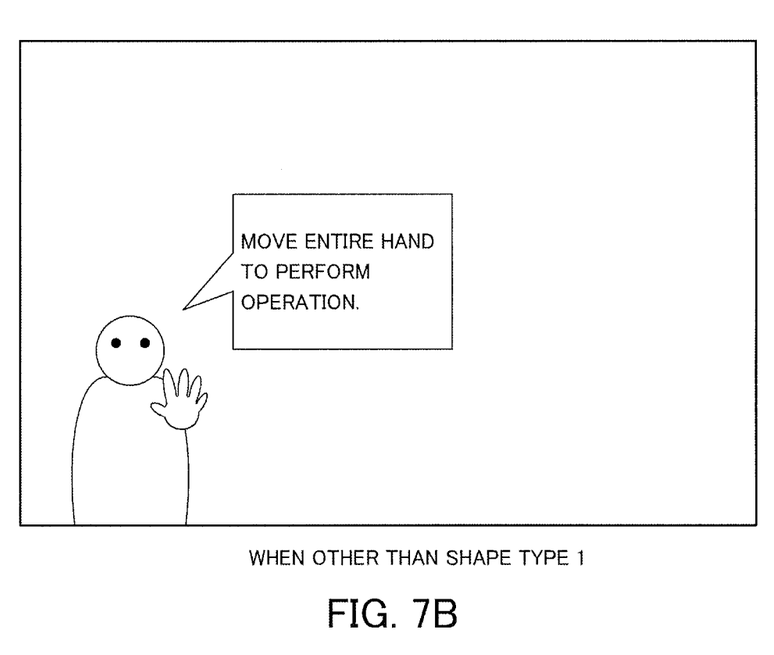

FIGS. 7A and 7B show examples of images displayed on a screen of a television receiver that is an object device. For example, when a detected shape of an object part is shape type 1, the fact that a gesture can be performed by moving a fingertip is notified, and when the detected shape is another shape type, the fact that a gesture can be performed by moving an entire hand is notified.

Moreover, other methods may be used to notify the user. For example, guidance may be displayed using text only or a window for guidance may be added to an ordinary operation screen to display graphics and text. Alternatively, a notification may be performed by sound or the like.

According to the second embodiment, since the user can recognize where a representative point that is tracked by the system is located, gesture input can be performed more intuitively.

Modifications

It is to be understood that the descriptions of the respective embodiments merely represent examples of the present invention and, as such, the present invention can be implemented by appropriately modifying or combining the embodiments without departing from the spirit and the scope of the invention.

For example, while the gesture recognition apparatus 100 has been assumed to be an apparatus that is built into the object device 200 in the description of the embodiments, the gesture recognition apparatus 100 may alternatively be an independent apparatus.

In addition, the gesture recognition apparatus 100 may be implemented as a program that runs on the object device 200. When implementing the gesture recognition apparatus 100 as a program, a configuration in which a program stored in a memory is executed by a processor or a configuration in which the program stored in the memory is executed by a field programmable gate array (FPGA) or an application specific integrated circuit (ASIC) may be adopted.

Furthermore, while an example where an image is acquired using a camera has been presented in the description of the embodiments, an image may be acquired by other methods including receiving an image via a network as long as a gesture can be acquired and, at the same time, a shape of an object part can be distinguished.

Moreover, the object part need not necessarily be a human hand. For example, the object part may be another body part, a marker for inputting a gesture, or the like.

When using a marker, the gesture extracting unit 102 may be configured to detect the presence of the marker and to set a representative point at a tip of the marker.

In addition, a "shape of an object part" as described in the present invention refers to a shape recognized by the gesture recognition apparatus through an image and need not necessarily be a physical deformation of the object part.

Furthermore, while two shape types, namely, "shape type 1" and "another shape type" are distinguished as shapes of an object part in the description of the embodiments, other shapes may be distinguished. Examples of such other shapes may include a closed hand and a state where two fingers are raised. Alternatively, three or more shapes may be distinguished. In any case, a position of a representative point may be determined based on a distinguished shape and processing may be performed according to the method described earlier.

For example, positions where a representative point is set may be defined as follows.

In case of shape type 0: center of gravity of first is representative point

In case of shape type 1: fingertip of raised finger is representative point

In case of shape type 2: midpoint between fingertips of two raised fingers is representative point In case of shape type 3: fingertip of middle finger among three raised fingers is representative point In case of shape types 4 and 5: center of gravity of palm of hand is representative point In addition, while an object part is detected from a camera image in step S12 and a shape of the object part is subsequently distinguished in step S13 in the description of the respective embodiments, these processes may be simultaneously executed by template matching or the like. Contents and a processing order of the processes are not particularly limited as long as a position where an object part is present and a shape of the object part can be acquired.

LIST OF REFERENCE NUMERALS

100: Gesture recognition apparatus
101: Image acquiring unit
102: Gesture extracting unit
103: Gesture recognizing unit
104: Command generating unit
200: Object device

CROSS REFERENCE TO RELATED APPLICATION

This application claims the benefit of Japanese Patent Application No. 2014-048911, filed on Mar. 12, 2014, which is hereby incorporated by reference herein in its entirety.

What is claimed is:

1. A gesture recognition apparatus detecting a gesture from an acquired image and generating for an object device an instruction corresponding to the gesture,
the gesture recognition apparatus comprising:
an image acquiring unit configured to acquire an image;
an object part extracting unit configured to extract a human hand performing a gesture as an object part performing a gesture from the acquired image;
an object part shape identifying unit configured to acquire a number of finger(s) that is/are extended in the object part and to identify a shape of the extracted object part based on the number of finger(s);
a representative point determining unit configured to set, with respect to the object part, a representative point that is a point representing a position of the object part;
a gesture recognizing unit configured to recognize a gesture, based on a motion of the representative point; and
a command generating unit configured to generate an instruction corresponding to the recognized gesture, wherein
the representative point determining unit determines a position of a representative point corresponding to the object part, using the identified shape of the object part using different ways depending on the number of fingers that is/are extended.

2. The gesture recognition apparatus according to claim 1, wherein
the representative point determining unit is configured to set a representative point at a tip of the protruding part when the shape of the object part as identified by the object part shape identifying unit is a shape including a protruding part.

3. The gesture recognition apparatus according to claim 1, wherein
the object part is a human hand, and
the representative point determining unit is configured
to determine whether the shape of the object part as identified by the object part shape identifying unit is a first shape or a second shape that differs from the first shape,
to set a representative point at a position corresponding to a fingertip when the shape of the object part is the first shape, and
to set a representative point at a position corresponding to a center of a hand when the shape of the object part is the second shape.

4. The gesture recognition apparatus according to claim 3, wherein
the representative point determining unit is configured to determine that a shape of a hand that is an object part as identified by the object part shape identifying unit is a first shape when at least one of the fingers is extended and to determine that a shape of a hand that is an object part as identified by the object part shape identifying unit is a second shape when all of the fingers are extended or all of the fingers are folded.

5. The gesture acquiring apparatus according to claim 3, wherein the representative point determining unit is configured to determine that a shape of a hand that is an object part as identified by the object part shape identifying unit is a first shape when only one finger is extended.

6. The gesture acquiring apparatus according to claim 3, wherein the representative point determining unit is configured to use a center of gravity of a region corresponding to the hand as extracted by the object part extracting unit as a position corresponding to the center of the hand.

7. The gesture recognition apparatus according to claim 1, further comprising a notifying unit configured to notify a user of a set position of a representative point.

8. A control method of a gesture recognition apparatus detecting a gesture from an acquired image and generating for an object device an instruction corresponding to the gesture, the control method comprising:

acquiring an image;

extracting a human hand performing a gesture as an object part performing a gesture from the acquired image;

acquiring a number of finger(s) that is/are extended in the object part;

identifying a shape of the extracted object part based on the number of finger(s);

setting, with respect to the object part, a representative point that is a point representing a position of the object part;

recognizing a gesture, based on a motion of the representative point; and generating an instruction corresponding to the recognized gesture, wherein the setting of the representative point involves determining a position of a representative point corresponding to the object part, using the identified shape of the object part in different ways depending on the number of fingers that is/are extended.

9. A non-transitory computer readable storing medium recording a computer program for causing a computer to perform the respective steps of the control method of a gesture recognition apparatus according to claim 8.

* * * * *

UNITED STATES PATENT AND TRADEMARK OFFICE
CERTIFICATE OF CORRECTION

PATENT NO. : 9,557,821 B2  Page 1 of 1
APPLICATION NO. : 14/614823
DATED : January 31, 2017
INVENTOR(S) : Kiyoaki Tanaka et al.

It is certified that error appears in the above-identified patent and that said Letters Patent is hereby corrected as shown below:

On the Title Page

The Applicant "Kiyoaki Tanaka, Shiga (JP); Takayoshi Yamashita, Aichi (JP); Mizuki Furuta, Kyoto (JP)" should read --OMRON Corporation--.

Signed and Sealed this
Sixth Day of June, 2017

Michelle K. Lee
*Director of the United States Patent and Trademark Office*